United States Patent [19]
Pay

[11] 3,778,547
[45] Dec. 11, 1973

[54] TELECINE EQUIPMENT

[75] Inventor: Donald Alexander Pay, W. Hanningfield, England

[73] Assignee: The Marconi Company Limited, Chelmsford, Essex, England

[22] Filed: Apr. 6, 1972

[21] Appl. No.: 241,779

[30] Foreign Application Priority Data
Apr. 6, 1971  Great Britain...................... 8,815/71

[52] U.S. Cl........... 178/7.88, 189/DIG. 28, 350/174
[51] Int. Cl. ............................................ G02b 27/14
[58] Field of Search................. 178/7.85, 7.88, 7.92, 178/DIG. 28; 350/174

[56] References Cited
UNITED STATES PATENTS
2,976,357  3/1961  Hammett...................... 178/DIG. 28
3,477,782  11/1969  Sherwin............................. 178/7.88
2,854,901  10/1958  Fathauer........................... 178/7.92
3,037,564  6/1962  Bruining..................... 178/DIG. 28
3,104,283  9/1963  Moller................................ 178/7.85

FOREIGN PATENTS OR APPLICATIONS
737,242  10/1932  France

Primary Examiner—Howard W. Britton
Attorney—Donald M. Wight et al.

[57]  ABSTRACT

Images from several projectors are selectively directed onto the viewing tube of a telecine equipment via an adjustable shutter, and onto a monitor tube via another adjustable shutter. The images traverse separate optical paths, each of which includes focussing lenses and mirrors to achieve a correct orientation of the image.

16 Claims, 2 Drawing Figures

TELECINE EQUIPMENT

This invention relates to improvements in telecine equipment and more specifically to telecine equipment wherein a plurality of images are selectably directable on to a viewing tube. The term telecine equipment is herein used in its broadest sense. That is, telecine equipment is meant to refer to not only cinematograph arrangements but also arrangements utilising slide (or still) projectors and television cameras.

Figure 1:
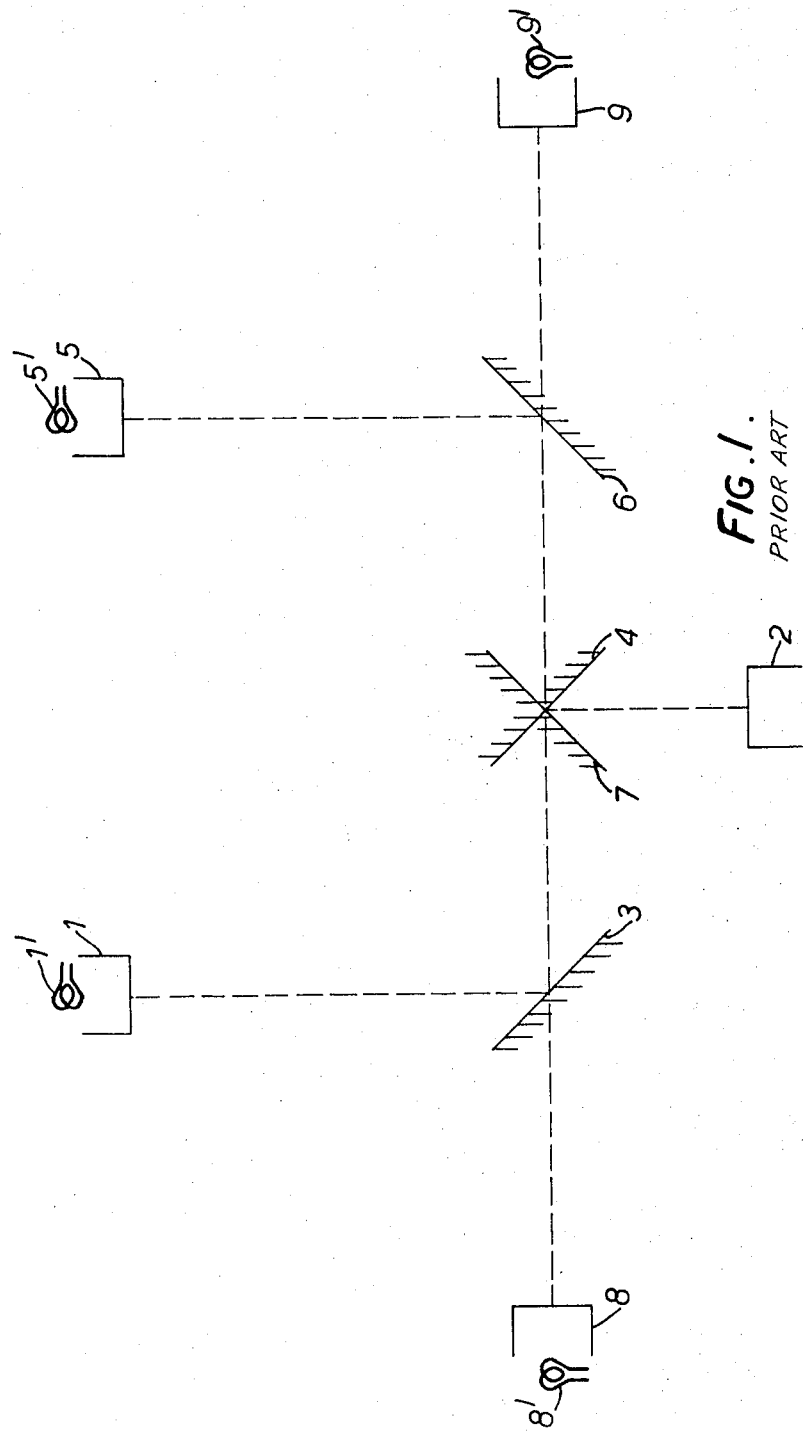

A typical known telecine equipment is shown in schematic form in FIG. 1 of the accompanying drawings. Referring to FIG. 1 an image from a cinematograph projector 1 having a lamp 1' is focussed into a viewing tube 2 of a television camera by means of a silvered mirror 3 and a silvered mirror 4. Mirror 4 and a further silvered mirror 7 are mechanically connected together so that when an image is focussed onto the viewing tube 2 from projector 1, mirror 4 is moved into the optical path and mirror 7 out of the optical path. An image from a cinematograph projector 5 having a lamp 5' is focussed onto the viewing tube 2 by a silvered mirror 6 and by inserting the mirror 7 into the optical path thereby rotating mirror 4 out of the optical path. An image from a slide projector 8 having a lamp 8' is focussed on to the viewing tube 2 by rotating the silvered mirrors 3 and 7 out of the path of projection so that the image from the projector 8 is reflected by silvered mirror 4 on to the viewing tube 2. Similarly an image from a slide projector 9 having a lamp 9' is focussed on to the viewing tube 2 by rotating the silvered mirrors 6 and 4 out of the projection path, the image being reflected on to the viewing tube by silvered mirror 7.

Thus, by using the arrangement of FIG. 1 it is possible to multiplex four inputs, from projectors 1, 5, 8 and 9, into one viewing tube 2 so that a successive series of slides or of reels of film may be transmitted utilising the same viewing tube 2.

Instead of using rotatable fully reflecting silvered mirrors 3 and 6, these mirrors (3 and 6) could be of the semi-silvered type. If semi-silvered mirrors were used then the lamps 1', 5', 8' or 9' of the projectors which were not in use would need to be either extinguished or a shutter (not shown) used to block their light transmission path. An output signal derived from the viewing tube 2 is utilised for monitoring purposes by suitable means (not shown).

This invention seeks to provide improved telecine equipment.

According to this invention a telecine equipment comprises a viewing tube, means for selectively directing light images from a plurality of light image sources on to said viewing tube over separate optical paths, and means for directing light images from said plurality of light image sources to a light image monitoring means.

Preferably said light image monitoring means is arranged selectively to receive light images from one only of said light sources at any one time.

Preferably the means for selectively directing each one of the plurality of light images comprises a projection lens, a mirror arrangement to ensure the correct orientation of the image to be viewed, and an adjustable shutter which is capable of permitting the image to be viewed to be projected on to the viewing tube and which is also capable of rejecting the images not to be seen by the viewing tube.

Preferably the means for directing light images is a partially light selecting means mounted between the mirror arrangement and the shutter whereby a visible part of the image is projected on to the light image monitoring means.

The partially light selecting means may be a semi-silvered mirror or a dichroic mirror.

The invention will now be described by way of example with reference to the accompanying FIG. 2 which shows an optical arrangement for a telecine equipment in accordance with one embodiment of the invention. It should be noted that like parts in the figures have been given like reference numerals.

Figure 2:
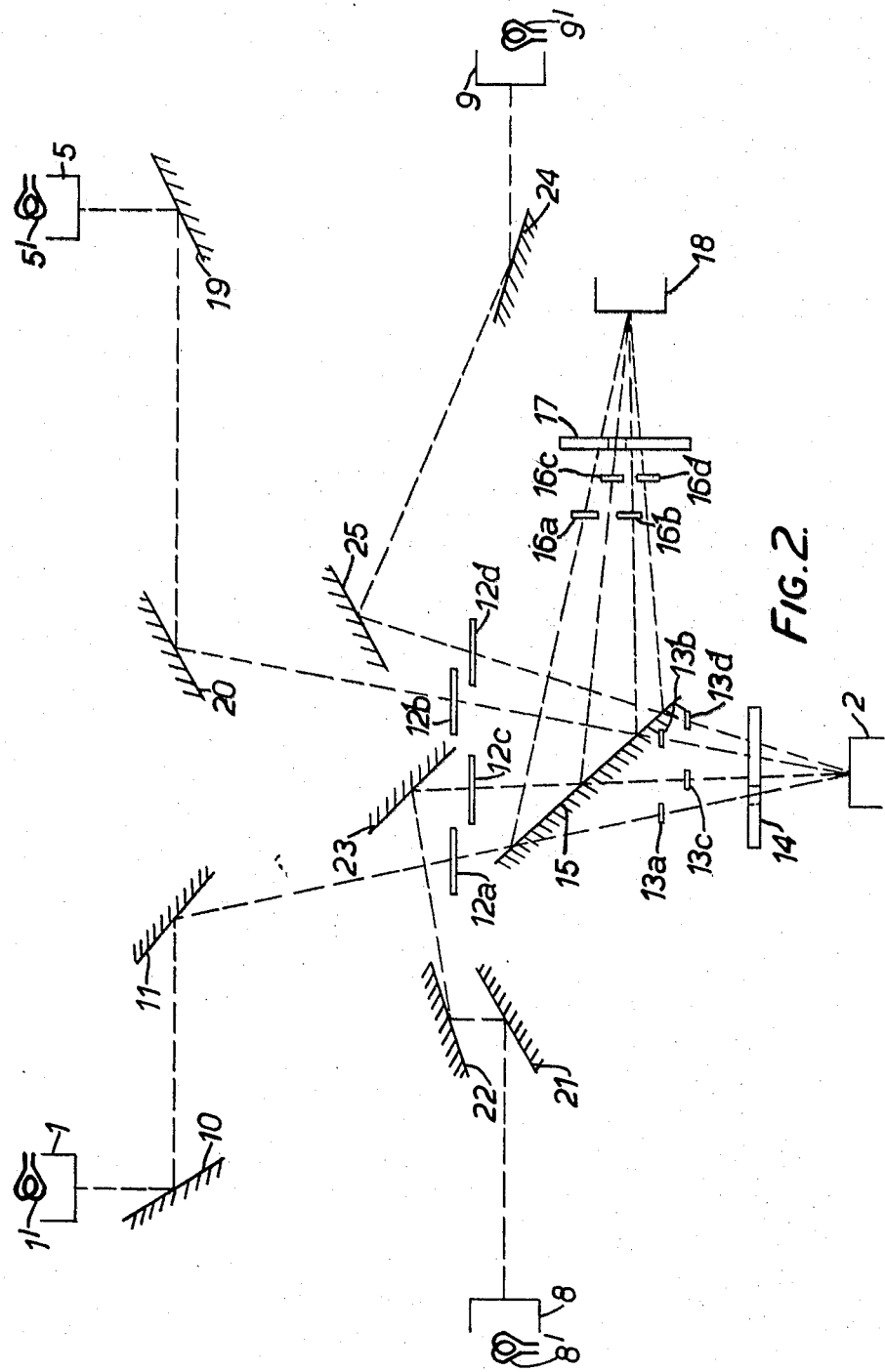

Referring to FIG. 2 a light image from the cinematograph projector 1 is reflected by a silvered mirror 10 and a further silvered mirror 11 before the image is finally formed on the viewing tube 2 by a field lens 12a and a relay lens 13a. A rotatable shutter 14 having an aperture which is large enough to permit the projection of only one image therethrough is interposed between the relay lens 13a and the viewing tube 2. Interposed between the field lens 12a and the relay lens 13a is a semi-silvered mirror 15 inclined at 45° to the axis of the viewing tube 2. The mirror 15 reflects the image via a relay lens 16a and a rotatable shutter 17 to a monitoring pick-up tube 18. The shutter 17 may be constructed similarly to the shutter 14.

Similarly a light image from the cinematograph projector 5 is reflected by silvered mirrors 19 and 20 before being focussed on to the viewing tube 2 by a field lens 12b and a relay lens 13b. The semi-silvered mirror 15 reflects the image from the projector 5 on to the pick-up tube 18 via a relay lens 16b.

A light image from the slide projector 8 is reflected by silvered mirrors 21, 22 and 23 prior to the image being focussed on to the viewing tube by a field lens 12c and a relay lens 13c. Again, the image from the projector 8 is reflected by the semi-silvered mirror 15 to be focussed on to the pick-up tube 18 by a relay lens 16c.

A light image produced by the slide projector 9 is reflected by a silvered mirror 24 and a further silvered mirror 25 prior to the image being focussed on to the viewing tube 2 by means of a field lens 12d and a relay lens 13d. The semi-silvered mirror 15 reflects the image produced by projector 9 and a relay lens 16d focusses the image upon the pick-up tube 18. The cinematographic film in the projectors 1 and 5 are arranged to be parallel with the face of the viewing tube 2, and the slides in the projectors 8 and 9 are arranged to be at right angles. Also, the axes of the lenses (not separately shown) of the projectors 1 and 5, the field lenses 12a, 12b, 12c and 12d and the relay lenses 13a, 13b, 13c and 13d are each arranged to be normal (i.e., at right angles) to the plane of the face of the viewing tube 2 and the axes of the lenses (not shown) of the projectors 8 and 9 are arranged to be parallel to the plane of the face of the viewing tube 2. For the sake of a compact arrangement the lenses 12a, 12b, 12c, 12d, 13a, 13b, 13c, 13d and 16a, 16b, 16c and 16d are spaced as if at the corners of square pyramids. Although the foregoing description has assumed the use of projector lenses (not shown), field lenses 12a, 12b, 12c and 12d, in which an image of the cinematographic film or slide is formed, and relay lenses 13a, 13b, 13c and 13d which form the final image on to the viewing tube 2, the lens arrangement could also consist of simply the projector lenses only.

The particular configuration of silvered mirrors 10, 11, 19, 20, 21, 22, 23, 24 and 25 is obtained so that there is a suitable mechanical arrangement of the projectors 1, 5, 8 and 9, and also to ensure that the images from all the projectors have the required orientation when produced on the viewing tube. In this connection it should be noted that the emulsion on the films face toward the lamps for projectors 1, 5 and 9, whilst the emulsion of the film slides used with projector 8 faces away from the lamp 8'. It will be obvious to those skilled in the art that there are many possible mirror arrangements that would perform satisfactorily, but these other arrangements will not herein be described.

In operation the lamps 1', 5', 8' and 9' of the projectors may be illuminated and the required image to be viewed, by the viewing tube 2, selected by rotating the shutter 14. Simultaneously, due to the reflection of the semi-silvered mirror 15, each of the images from the projectors may be monitored on the pick-up tube 18 by rotating the shutter 17.

The semi-silvered mirror could, alternatively, be replaced by a dichroic mirror or a totally reflecting moving mirror. In the case of a totally reflecting moving mirror, which of course would have an aperture large enough to permit only one image to pass therethrough, the shutters 14 and 17 would not be required. Thus the lamps 1', 5', 8' or 9' of the projectors not being viewed or monitored would require to be extinguished.

As will be appreciated by those skilled in the art the viewing tube 2 may be replaced by an optical splitting block and either a three or four tube colour television camera. Also the shutters 14 and 17 may be replaced by a more complex device which would allow two or more inputs to be mixed.

It will therefore be noted that the present invention provides an arrangement whereby the images from the projectors are converged on to the face of the viewing tube 2 over separate optical paths and thus a relatively simple mechanism is provided for monitoring images prior to display on the viewing tube 2.

I claim:

1. A telecine equipment comprising a viewing tube, a plurality of light image sources, means for selectively directing light images from said plurality of light image sources onto said viewing tube over optical paths which are separate throughout their lengths, light image monitoring means, and means for directing light images from said plurality of light image sources to said light image monitoring means.

2. A telecine equipment as claimed in claim 1 wherein said light image monitoring means is arranged selectively to receive light images from one only of said light image sources at any one time.

3. A telecine equipment as claimed in claim 1 wherein the means for selectively directing each one of the plurality of light images comprises a projection lens, a mirror arrangement to ensure the correct orientation of the image to be viewed, and an adjustable shutter which is capable of permitting the image to be viewed to be projected on to the viewing tube and which is also capable of rejecting the images not to be seen by the viewing tube.

4. A telecine equipment as claimed in claim 3 wherein the means for directing light images is a partially light selecting means mounted between the mirror arrangement and the shutter whereby a visible part of the image is projected on to the light image monitoring means.

5. A telecine equipment as claimed in claim 4 wherein the light selecting means is a semi-silvered mirror.

6. A telecine equipment as claimed in claim 4 wherein the light selecting means is a dichroic mirror.

7. A telecine system comprising, in combination;
first viewing tube means on which images from different sources may be projected for transmission in television format;
second viewing tube means on which said images from different sources may also be projected for monitoring purposes;
at least a pair of image sources disposed in spaced relation to each other;
means for projecting images from both of said sources onto said first viewing tube means over separate optical paths having respective optical path portions converging to said first viewing tube means in which such portions are of a length sufficient with respect to their convergence to define separate and non-overlapping image-intercepting regions in a plane pierced by said optical path portions;
first selection means contained in said plane for selectively blocking and passing images through said regions selectively to control which of said images reaches said first viewing tube;
partial reflecting means disposed in a plane closer to said image sources than is said plane first mentioned for producing second optical path portions converging from said partial reflecting means to said second viewing tube in which the lengths of said second optical paths portions with respect to their convergence is sufficient to define separate and non-overlapping image-intercepting portions in a plane pierced by said second optical path portions; and
second selection means contained in said plane pierced by said second optical path portions for selectively blocking and passing images through said region selectively to control which of said images reaches said second viewing tube independently of that image reaching said first viewing tube.

8. A telecine system as defined in claim 7 wherein each said first and second selection means comprises a rotatable shutter.

9. A telecine system as defined in claim 7 wherein said means for projecting include a field lens for each image source located between such image source and said partial reflecting means and a relay lens for each image source located on the other side of said partial reflecting means, and there being a relay lens located along each of said second optical path portions between said partial reflecting means and said second selection means.

10. A telecine system comprising, in combination:
viewing tube means for receiving a selected number of images from a plurality of image sources;
a plurality of separate image sources;
a plurality of fixed optical system means each interposed between a respective image source and said viewing tube means for directing images from the respective image source to said viewing tube means along an optical path unique throughout to such respective image source;

first aperture-forming means interposed in the unique optical paths of said plurality of image sources for selectively blocking and passing images along each such path independently of the other paths whereby to select which of said images reaches said viewing tube means;

monitoring means for monitoring images from said image sources;

partial reflecting means interposed in the unique paths from said image sources for directing images from said sources along unique second optical path portions to said monitoring means; and aperture-forming means interposed in said unique second optical path portions for selectively blocking and passing images along each said unique second path portions whereby to select which of said images reaches said monitoring means independently of any image reaching said viewing tube means.

11. A telecine system as defined in claim 10 wherein said means for projecting include a field lens for each image source located between such image source and said partial reflecting means and a relay lens for each image source located on the other side of said partial reflecting means, and there being a relay lens located along each of said second optical paths portions between said partial reflecting means and said second selection means.

12. In a telecine system of the type including viewing tube means, a plurality of image sources, and projecting means for selectively projecting images from said sources to said viewing tube means, the improvement wherein:

said projecting means comprises separate means associated with each image source for defining an optical path from each associated image source to said viewing tube means which is unique throughout its length to such associated image source; and including movable control means interposed in said paths which are unique throughout to the individual image sources for selectively blocking and passing images directed along such paths;

monitoring means;

reflecting means interposed in said optical paths for directing images from said sources along unique second optical path portions to said monitoring means; and second movable control means interposed in said second optical path portions for selectively blocking and passing images directed along such second path portions.

13. A telecine system as defined in claim 12 wherein said means for projecting include a field lens for each image source located between such image source and said partial reflecting means, and there being a relay lens located along each of said second optical path portions between said partial reflecting means and said second selection means.

14. A telecine system comprising, in combination:

a plurality of separate image sources and viewing tube means for receiving the images from said sources;

optical path-forming means interposed between each image source and said viewing tube means for projecting images from said sources along separate optical paths having portions for each image source in which said portions converge to said viewing tube means;

monitoring means for receiving images from said sources; and control means interposed in said portions of the separate optical paths for selectively controlling projection of individual images both to said viewing tube means and to said monitoring means.

15. A telecine system as defined in claim 14 wherein said control means comprises a semi-reflecting mirror disposed in a plane intercepting said optical path portions which converge, first aperture-forming means interposed between said mirror and said viewing tube means, and second aperture-forming means interposed between said mirror and said monitoring means.

16. A telecine system as defined in claim 14 wherein said optical path-forming means includes, for each image source, a field lens and a relay lens located on opposite sides of that portion of the control means which controls projection of said images to said viewing tube means, the field lens in each case being disposed nearest to its associated image source, and there being a relay lens for each image source located adjacent that portion of the control means which controls projection of said images to said monitoring means.

* * * * *